April 25, 1933. J. B. SINDERSON 1,905,311
METHOD OF AND MACHINE FOR HOBBING GEAR TEETH
Filed April 2, 1928 3 Sheets-Sheet 2
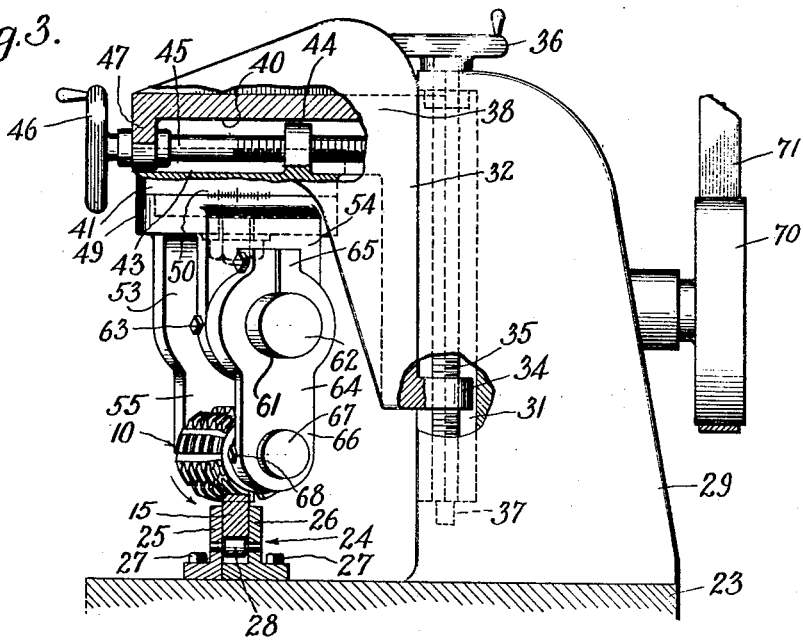
Fig.3.
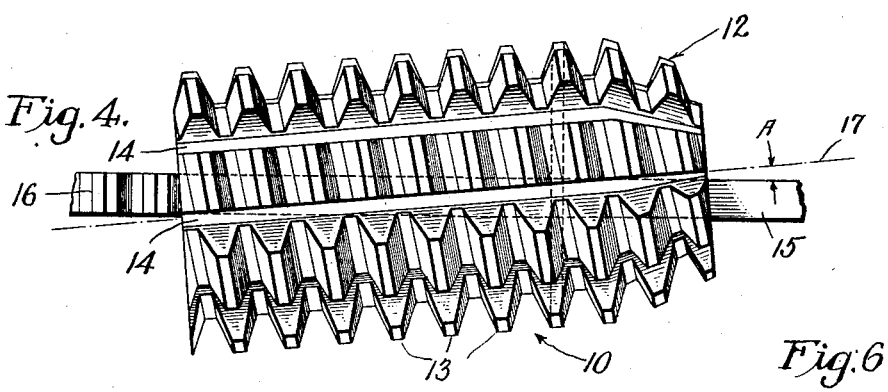
Fig.4.
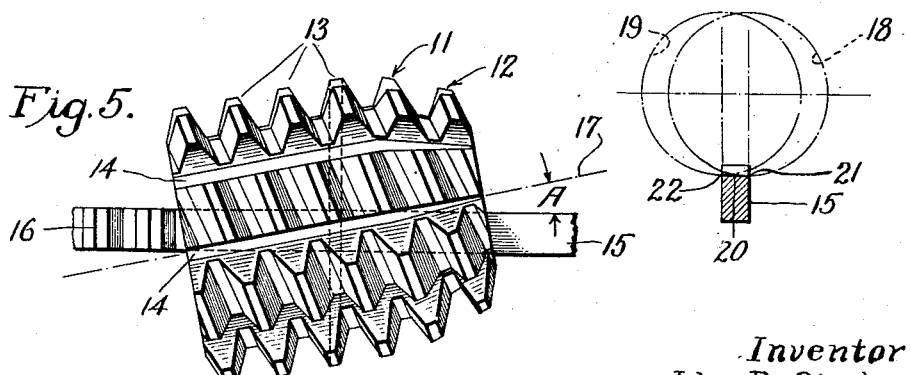
Fig.5.
Fig.6.
Inventor
John B. Sinderson
By
Att'ys.

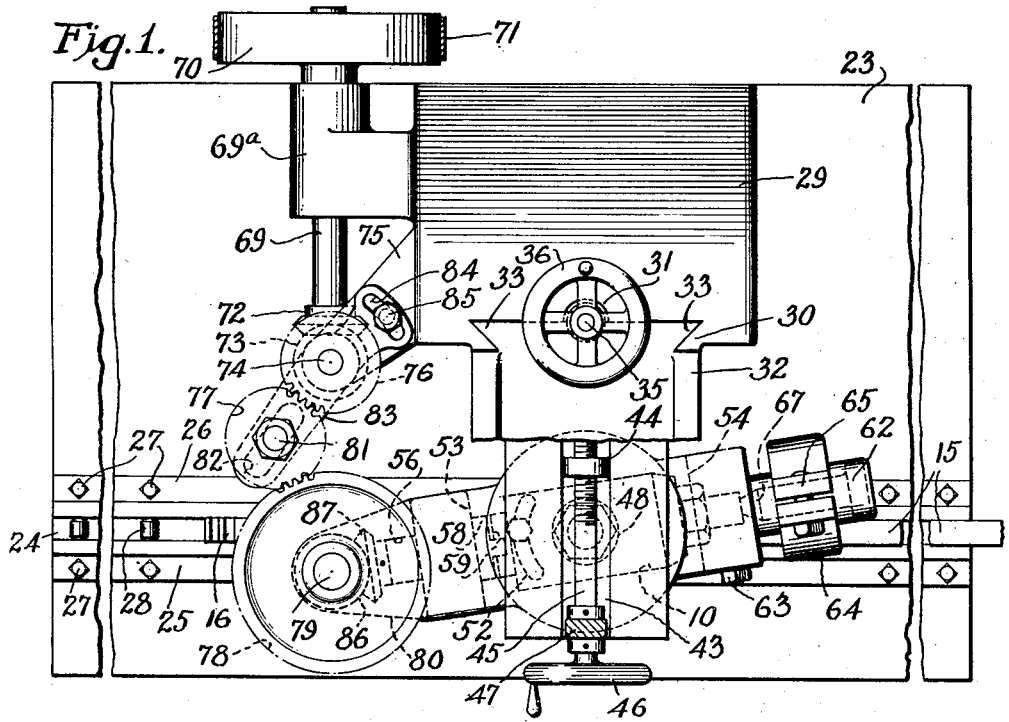

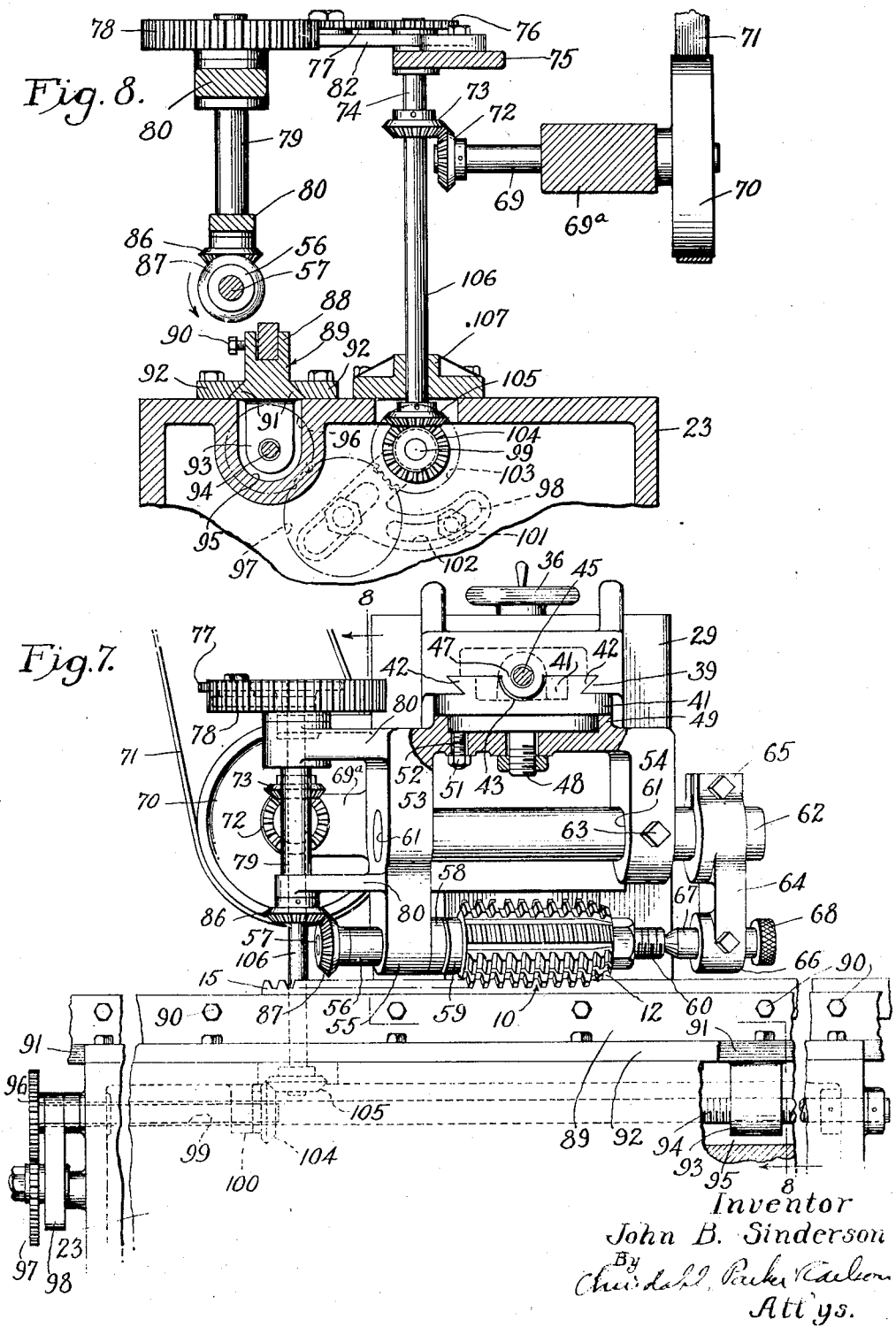

Patented Apr. 25, 1933

1,905,311

UNITED STATES PATENT OFFICE

JOHN B. SINDERSON, OF ROCKFORD, ILLINOIS, ASSIGNOR TO BARBER-COLMAN COMPANY, OF ROCKFORD, ILLINOIS, A CORPORATION OF ILLINOIS

METHOD OF AND MACHINE FOR HOBBING GEAR TEETH

Application filed April 2, 1928. Serial No. 266,611.

The present invention relates to improvements in the cutting of gears, such as gear racks, and has particular reference to a new and improved machine and method for this purpose.

An important object of the present invention resides in the provision of a novel method of and machine for continuously cutting racks without regard to length.

A more specific object is to provide a method and machine of the foregoing character in which a hob is employed as the cutting element.

Other objects reside in the provision of a new and improved method of and machine for hobbing gears, particularly racks, in which the teeth are cut straight and without relative lateral shifting of the hob, and in which wear on the hob is distributed over its length.

A general object is to provide a novel method and machine whereby gear racks can be cut correctly, efficiently, quickly and cheaply.

Further objects and advantages will become apparent as the description proceeds.

In the accompanying drawings, Figure 1 is a fragmentary plan view of a machine embodying the features of my invention.

Fig. 2 is a fragmentary front elevational view of the machine, parts being broken away and sectioned.

Fig. 3 is a right end view of the machine, parts being broken away and sectioned to show the means for adjusting the hob.

Figs. 4, 5, and 6 are diagrammatic views illustrating a method embodying the features of my invention, Fig. 4 showing a single thread hob, Fig. 5 showing a multiple thread hob and Fig. 6 showing the relationship between the inclination of the hob and the width of the rack.

Fig. 7 is a front elevational view of a modified form of the machine.

Fig. 8 is a sectional view taken along line 8—8 of Fig. 7.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In attaining the foregoing objects, a hob of suitable construction, such as the single thread hob 10 in Fig. 4, and the multiple thread hob 11 in Fig. 5, is utilized to cut the desired gear blank. Preferably, each of the hobs 10 and 11 is reduced in size at its forward end to form a gradually tapering nose 12, and in other respects may be a standard hod having one or more threads 13 intersected by generally longitudinal flutes 14 to form teeth which are suitably relieved.

The invention contemplates the cutting of straight gear teeth without necessarily shifting the hob laterally, and is particularly adapted for the continuous cutting of gear racks without regard to length, and therefore is illustrated in the drawings in connection with a rack blank 15 adapted to have straight parallel gear teeth 16 formed thereon.

In positioning the hob in cutting relation to the blank 15, it is inclined longitudinally at an angle, designated as A, corresponding to the angle of the hob thread. Obviously, as shown in Figs. 4 and 5, this angle is less for the single thread hob 10 than for the multiple thread hob 11. The minimum length of the hob bears a definite relation to the angle A and the width of the blank 15, and is such that the center line, designated as 17, of the hob along the full diameter extends diagonally completely across the blank. Obviously, where the angle A is large, as in Fig. 5, the hob may be relatively short.

In Fig. 6, the broken circle 18 represents the front end of the hob, and the broken circle 19 represents the rear end of the hob. These circles are tangent to the roots, designated as 20, of the rack teeth 16 respectively at points 21 and 22 in opposite sides of the rack. It will be evident that as the blank 15 is moved longitudinally relatively along the hob, the final cut to the desired depth along each tooth will shift from the point 21 to the point 22, thus generating a straight tooth of uniform cross-section. Hence the cutting action is gradual, most of the cut being preparatory to the final cut. The nose 12 produces a roughing cut to make the action still more gradual.

The minimum length of the hob exclusive of the nose may be expressed as follows: L=W Csc. A, where L=the minimum or effective length of the hob, W=the width of the rack blank, and A=the angle of the hob relative to the blank.

Obviously, the rack may be of any length. If desired, a single strip or a plurality of successive strips may be passed relatively along the hob. The method thus permits the continuous hobbing of gear racks with straight teeth and at a high speed. The cut is gradual, and wear on the hob is evenly distributed throughout its effective length. No lateral shifting of the hob is necessary, and hence but little space is required for carrying on the operation.

In-so-far as the method is concerned, any suitable machine comprising means for supporting the hob and the work blank in correct cutting relation, means for rotating the hob, and means for effecting a correct relative generally longitudinal movement between the hob and the blank may be employed. In Figs. 1 to 3 inclusive, I have shown a machine embodying the preferred form of the invention, and in Figs. 7 and 8, I have shown a slightly modified form of the machine.

Referring first to Figs. 1 to 3, the machine illustrated comprises a suitable base 23, preferably horizontal. Formed on the base is a suitable guideway 24 for the work blank. In the present instance, the guideway 24 (see Fig. 3) is formed by an angle bar 25 and an inverted T-bar 26 secured in position with two long legs in parallel spaced relation. Preferably, the bars 25 and 26 are secured to the base 23 in any suitable manner, as by means of bolts 27, so that the spaced legs project vertically. One short leg of the T-bar 26 abuts against the angle bar 25, and underlies the space between the vertical legs in which the rack blank is to be guided along the hob. Journaled in the vertical legs of the two bars 25 and 26 in spaced relation along the same are a plurality of rollers 28 to facilitate the longitudinal movement of the rack blank in the guideway 24.

Extending up from the base 23 at one side of the guideway 24 is a suitable standard 29 formed in its front face with dove-tailed guideways 30, and with a vertical channel 31 between the guideways.

A head 32 having dove-tailed guides 33 disposed in the guideways 30 is mounted for vertical adjustment on the standard 29. To this end, the head 32 is formed on its lower end with a nut 34 preferably integral therewith and projecting rearwardly into the channel 31. An adjusting screw 35 having a suitable hand wheel 36 on its upper end is journaled in the upper end of the standard 29 and depends through the channel 31 into threaded engagement with the nut 34. Preferably, the lower end of the adjusting screw 35 is anchored in a suitable socket 37 in the lower end of the standard 29.

The head 32 has a lateral extension 38 which projects across the guideway 24, and which is formed on its underside with suitable longitudinal dove-tailed guideways 39 and a longitudinal channel 40 centrally between the guideways.

A slide 41 having dove-tailed guides 42 disposed in the guideways 39 is mounted for adjustment along the extension 38. To this end, the slide is formed in its upper face and between the guides 42 with a longitudinal channel 43 in opposed relation to the channel 40, and with a nut 44 preferably integral therewith and projecting upwardly from the channel 43 into the channel 40. An adjusting screw 45 having a suitable hand wheel 46 on its forward end is journaled against endwise movement in a lug 47 depending from the front end of the extension 38 into the channel 43, and extends rearwardly into threaded engagement with the nut 44.

Pivotally mounted on the underside of the slide 41 by means of a stud 48 is a saddle 49 for supporting the hob. The angular position of the saddle 49 may be indicated by means of suitable micrometer graduations 50 (see Fig. 3), and the saddle 49 may be secured in any position of adjustment by means of a suitable bolt 51, preferably extending from the slide 41 through an arcuate slot 52 in the saddle, and adapted to be turned into clamping engagement with the edges of the slot.

Depending from the saddle 49 are two parallel spaced arms 53 and 54 of which the first is formed with a reduced extension 55. Secured in the extension 55 is a sleeve 56 in which a suitable spindle 57 is mounted for rotation. One end of the spindle 57 has a clutch element 58 adapted to coact with a clutch element 59 on an arbor 60 for the hob to support and drive the latter.

Extending through alined openings 61 in the arms 53 and 54 is a horizontal rod 62 adapted to be clamped in position by means of a suitable set screw 63. A supporting strap 64 has a suitable split clamp 65 on one end adapted to be secured in different positions of adjustment on the free end of the rod 62 remote from the arm 53. The lower end of the strap 64 is formed with a suitable sleeve 66 in which a center 67 is adapted to be secured in different positions of adjustment by means of a clamp screw 68. The center 67 is adapted to support the free end of the arbor 60.

Means is provided for rotating the hob. This means preferably comprises a main shaft 69 journaled in a bearing bracket 69ª, and having a pulley 70 on one end adapted to be connected through a belt 71 to a suitable source of power (not shown). Preferably, the bearing bracket 69ª is formed on one side of the standard 29. The other end of the shaft 69 is connected through bevel gears 72 and 73 to a vertical stub shaft 74 journaled in a bearing bracket 75, preferably also formed on one side of the standard 29. The upper end of the stub shaft 74 is connected through a gear 76 and an idler gear 77 to a gear 78 on the upper end of a shaft 79 journaled in a pair of spaced bearing brackets 80 extending laterally from the arm 53. The idler gear 77 is mounted on a pin 81 adjustably and removably secured in a slot 82 in one end of a carrier 83 pivotally adjustable about the shaft 74. One end of the carrier 83 is formed with an arcuate slot 84, and is adapted to be secured in the desired position of adjustment by means of a clamp bolt 85 extending from the bearing bracket 75 through said slot. The lower end of the shaft 79 is connected through bevel gears 86 and 87 to the spindle 57.

In operation, the rack blank will be moved along the hob by the cutting action to cut the rack teeth. Means may be provided for relatively moving the rack positively along the hob. Such a means is provided in the machine shown in Figs. 7 and 8 which, in other respects, is similar to the machine shown in Figs. 1 to 3. Corresponding parts are therefore designated by the same reference characters.

In the machine of Figs. 7 and 8, the rack blank is adapted to be clamped in a channel 88 formed in an elongated slide 89 by any suitable means, such as a plurality of screw bolts 90. Preferably, the slide 89 is formed on its under side with dove-tailed guides 91 which are slidably clamped to the top of the base 23 by suitable gib plates 92. In this form of the invention, the plates 92 thus define the guideway for the rack blank, and the slide 89 serves as a carrier for imparting motion to the blank.

Depending from the under side of the slide 89 is a lug 93 having a threaded engagement with a feed screw 94. The lug 93 is disposed in, and the feed screw 94 extends through a trough 95 formed in the upper wall of the base 23. The screw 94 is journaled at its opposite ends against endwise movement in the end walls of the base 23, and is provided on one end with a gear 96, in mesh with an idler gear 97 adjustably mounted on a carrier 98. The carrier 98 is pivotally mounted at one end on a shaft 99 journaled at its opposite ends in the adjacent end wall of the base 23 and a bearing lug 100 depending from the top wall of the base, and is adapted to be clamped in different positions of adjustment by means of a clamp bolt 101 engaging an arcuate slot 102 therein. The gear 97 meshes with a gear 103 on the outer end of the shaft 99, and the latter is connected through bevel gears 104 and 105 to an extension 106 of the stub shaft 74. This extension 106 is journaled in a bearing cap 107 on the base 23.

In operation, the hob is adjusted into position directly over the guideway for the rack blank so as to hob the blank upon relative movement between the two longitudinally of the blank. The hob is disposed at an angle to the blank, and is of such length that the axis of the cylindrical portion extends longitudinally completely across the width of the blank. If the teeth are to be cut at right angles to the length of the rack, this angle is made to correspond to the angle of the hob thread. The nose 12 obviously extends beyond the cylindrical portion, and serves to produce a roughing cut at one side of the rack blank. With the parts in operative relation, rotation is imparted to the hob, and the rack blank is moved endwise into engagement therewith. The cutting action serves to advance the rack blank longitudinally along the hob. In Figs. 7 and 8, the rack blank is advanced positively. As the rack blank advances, the cut on each tooth moves across the blank so as to generate straight uniform teeth. The cutting action is continuous without regard to the length of the work blank, and is expeditious and efficient. No shifting of the hob laterally of the blank is necessary.

I claim as my invention:

1. The method of hobbing gear racks with a hob having a cylindrical portion of uniform pitch comprising positioning the hob and the rack blank in operative relation to cut the rack blank upon relative movement therebetween longitudinally of the rack blank, the hob being inclined longitudinally to the rack blank to extend diagonally completely across the rack blank, and causing said relative movement with the hob in rotation.

2. The method of continuously hobbing straight flat gear racks with straight transverse teeth of uniform cross-section from end to end comprising positioning the hob and the rack blank in operative relation to cut the blank upon relative rectilinear feeding movement therebetween along the blank, the hob being inclined at an angle corresponding to the angle of the hob thread and extending longitudinally completely across the width of the blank, and causing said relative movement with the hob rotating in timed relation to said movement.

3. The method of hobbing gear racks with a hob having a cylindrical portion of uniform pitch comprising positioning the hob and the rack blank in operative relation to cut the rack blank upon relative movement therebetween longitudinally of the rack blank, the hob being inclined longitudinally to the rack blank at an angle corresponding to the angle of the hob thread and the cylindrical portion of the hob extending axially completely across the width of the rack blank, and causing said relative movement with the hob in timed rotation.

4. The method of hobbing gear racks comprising positioning the hob and the rack blank in operative relation to cut the rack blank upon relative movement therebetween longitudinally of the rack blank, the hob being inclined longitudinally to the rack blank at an angle corresponding to the angle of the hob thread and extending longitudinally completely across the width of the rack blank, rotating the hob, and feeding the rack blank longitudinally into cutting engagement with the hob, the cutting action serving thereafter to advance the rack blank through the cutting zone in timed relation to the rotation of the hob.

5. The method of hobbing racks comprising positioning the hob and the rack blank in operative relation to cut the rack blank upon relative movement therebetween longitudinally of the rack blank, the hob being inclined longitudinally to the rack blank at an angle corresponding to the angle of the hob thread and extending longitudinally completely across the width of the rack blank, and rotating the hob in cutting engagement with the rack blank.

6. The method of hobbing racks comprising positioning the hob and the rack blank in operative relation to cut the rack blank upon relative movement therebetween longitudinally of the rack blank, the hob being inclined longitudinally to the rack blank at an angle corresponding to the angle of the hob thread and extending longitudinally completely across the width of the tooth zone of the rack blank, rotating the hob, and longitudinally moving the rack blank relative to the hob.

7. The method of hobbing racks with a hob having a tapered nose comprising positioning the hob and the rack blank in operative relation to cut the rack blank upon relative movement therebetween longitudinally of the rack blank, the hob being inclined longitudinally to the rack blank at an angle corresponding to the angle of the hob thread and the portion of full diameter extending longitudinally completely across the width of the rack blank, and causing said relative movement with the hob in rotation.

8. The method of continuously hobbing flat elongated gear rack blanks comprising positioning the rack blank and a rotating hob with a cylindrical body portion and a tapered nose in operative relation to cut the blank upon relative rectilinear feeding movement therebetween along the surface of the blank, and effecting such relative movement to cause the nose to make a roughing cut at one side of the blank and to cause the body portion to make a progressive cut from said side obliquely to the other side of the blank.

9. A machine for hobbing racks comprising, in combination, means for operatively supporting a rack blank, means for operatively supporting a hob, said means being relatively adjustable to permit said hob and said blank to be positioned in cutting relation in which said hob is disposed at an angle longitudinally of said blank corresponding to the angle of one of the hob threads and in which said hob extends completely across the width of said blank, and means for rotating said hob.

10. A machine for hobbing racks comprising, in combination, a hob having a cylindrical portion of substantially uniform pitch, means for positioning the rack blank and the hob in cutting relation with the hob axially disposed at an angle longitudinally of the blank and of such length as to extend longitudinally across the width of the tooth zone of the blank, and means for rotating the hob.

11. A machine for hobbing racks comprising, in combination, a hob, means for positioning the rack blank and the hob in cutting relation with the hob axially disposed at an angle longitudinally of the blank and of such length as to extend longitudinally across the width of the blank, means for rotating the hob, and means for longitudinally feeding the blank relatively to the hob.

12. A machine for hobbing racks having, in combination, a base having a vertical standard, a guideway formed on said base for a rack blank, said guideway having a roller table to facilitate the longitudinal movement of the blank, a head vertically adjustable on said standard and extending over said guideway, a slide horizontally adjustable on said head over said guideway, a hob, a saddle pivotally adjustable on the underside of said slide and having means for rotatably supporting the hob, and means for rotating the hob, the cutting action serving to effect a longitudinal movement of the blank on said table along the hob.

13. A machine for hobbing racks having, in combination, a base having a standard, a guideway formed on said base for a rack blank, said guideway having a roller table to facilitate the longitudinal movement of the blank, a hob having a generally cylindrical cutting portion, means on said standard for adjustably supporting the hob with the axis of said portion extending completely across said guideway, and means for rotating said hob.

14. A machine for hobbing racks comprising, in combination, a hob, means for positioning the rack blank and the hob in cutting relation with the hob axially disposed at an angle longitudinally of the blank and of such length as to extend longitudinally across the width of the blank, the hob having a tapered nose for taking a roughing cut, means for feeding the blank longitudinally through cutting engagement with the hob and means for rotating the hob in timed relation to the feeding movement of the blank.

15. A machine for hobbing racks comprising, in combination, a base having a vertical standard, a guideway formed on said base for a rack blank, a head vertically adjustable on said standard and extending over said guideway, a slide horizontlly adjustable on said head over said guideway, a saddle pivotally adjustable on the underside of said slide and having means for rotatably supporting the hob, and means for rotating the hob.

16. A machine for hobbing racks comprising, in combination, a narrow elongated guideway for a rack blank, means for supporting the hob with the axis thereof extending completely across said guideway, said last mentioned means being adjustable to vary the angular disposition of the hob relative to said guideway and to vary the depth of cut, and means for rotating the hob.

17. The method of hobbing a blank with straight parallel tooth projections in a single plane comprising positioning the hob and the blank in operative relation to cut the projections upon relative rectilinear feeding movement between the hob and the blank transversely of the individual projections, the hob being axially inclined to the direction of said movement and extending axially completely across the zone of the projections, causing said relative movement, and simultaneously rotating the hob in timed relation to said movement.

18. A machine for hobbing elongated gear racks having, in combination, a support, means on said support for guiding a rack blank for longitudinal movement, means for adjustably supporting a hob with the axis of the effective cylindrical portion thereof extending completely diagonally across the blank, and drive means for positively feeding the rack blank through cutting engagement with the hob and simultaneously rotating the hob in timed relation.

19. A machine for hobbing elongated gear racks comprising, in combination, a hob having a cylindrical portion of substantially uniform pitch, means for slidably supporting the rack blank, means for supporting the hob with the cylindrical portion in cutting relation with the rack blank and disposed axially at an angle longitudinally of the blank, said cylindrical portion being of such length as to extend longitudinally across the width of the tooth zone of the blank, the blank being freely slidable longitudinally in said first mentioned means in response to meshing cutting engagement with the cylindrical portion, and means for rotating the hob.

In testimony whereof, I have hereunto affixed my signature.

JOHN B. SINDERSON.